US008344689B2

(12) United States Patent
Boguslavskij

(10) Patent No.: US 8,344,689 B2
(45) Date of Patent: Jan. 1, 2013

(54) HEARING AID AND ENERGY CHARGER AS WELL AS ASSOCIATED METHOD

(75) Inventor: Mihail Boguslavskij, Coburg (DE)

(73) Assignee: Siemens Medical Instruments Pte. Ltd., Singapore (SG)

( * ) Notice: Subject to any disclaimer, the term of this patent is extended or adjusted under 35 U.S.C. 154(b) by 830 days.

(21) Appl. No.: 12/464,305

(22) Filed: May 12, 2009

(65) Prior Publication Data

US 2009/0285426 A1 Nov. 19, 2009

(51) Int. Cl.
*H02J 7/00* (2006.01)

(52) U.S. Cl. ......... 320/108; 381/315; 381/322; 381/151

(58) Field of Classification Search .................. 381/315, 381/322, 151; 320/108, 137
See application file for complete search history.

(56) References Cited

U.S. PATENT DOCUMENTS

| | | | | |
|---|---|---|---|---|
| 5,276,910 | A * | 1/1994 | Buchele | 455/41.1 |
| 6,658,124 | B1 * | 12/2003 | Meadows | 381/323 |
| 7,127,078 | B2 * | 10/2006 | Mann et al. | 381/326 |
| 7,742,614 | B2 * | 6/2010 | Christensen et al. | 381/324 |
| 2002/0071581 | A1 * | 6/2002 | Leysieffer et al. | 381/312 |
| 2002/0076071 | A1 * | 6/2002 | Single | 381/312 |
| 2005/0277999 | A1 * | 12/2005 | Strother et al. | 607/48 |
| 2007/0299483 | A1 * | 12/2007 | Strother et al. | 607/48 |
| 2008/0056520 | A1 * | 3/2008 | Christensen et al. | 381/323 |
| 2008/0132974 | A1 * | 6/2008 | Strother et al. | 607/60 |
| 2008/0137890 | A1 * | 6/2008 | Petersen et al. | 381/323 |
| 2008/0170733 | A1 * | 7/2008 | Reithinger | 381/315 |
| 2008/0205678 | A1 * | 8/2008 | Boguslavskij et al. | 381/312 |
| 2008/0243210 | A1 * | 10/2008 | Doron et al. | 607/60 |
| 2009/0092269 | A1 * | 4/2009 | Nielsen et al. | 381/313 |
| 2009/0096413 | A1 * | 4/2009 | Partovi et al. | 320/108 |
| 2009/0198307 | A1 * | 8/2009 | Mi et al. | 607/60 |
| 2009/0257610 | A1 * | 10/2009 | Wu et al. | 381/323 |
| 2009/0285426 | A1 * | 11/2009 | Boguslavskij | 381/323 |
| 2010/0046778 | A1 * | 2/2010 | Crawford et al. | 381/322 |
| 2010/0098278 | A1 * | 4/2010 | Sorensen et al. | 381/323 |
| 2010/0201314 | A1 * | 8/2010 | Toncich et al. | 320/108 |
| 2010/0202639 | A1 * | 8/2010 | Christensen et al. | 381/315 |
| 2010/0237823 | A1 * | 9/2010 | Silverman | 320/101 |
| 2011/0115429 | A1 * | 5/2011 | Toivola et al. | 320/108 |
| 2011/0175568 | A1 * | 7/2011 | Leijssen et al. | 320/108 |
| 2011/0179943 | A1 * | 7/2011 | Bowen | 84/612 |
| 2011/0215756 | A1 * | 9/2011 | Shimizu | 320/108 |
| 2011/0248673 | A1 * | 10/2011 | Aerts et al. | 320/108 |
| 2012/0189146 | A1 * | 7/2012 | Wuidart | 381/312 |

FOREIGN PATENT DOCUMENTS

| | | | |
|---|---|---|---|
| DE | 19745101 | A1 | 4/1999 |
| DE | 10047388 | C1 | 1/2002 |
| DE | 10 2007 009 176 | A1 | 9/2008 |
| EP | 0499939 | A1 | 8/1992 |
| EP | 0984664 | A1 | 3/2000 |
| EP | 1251809 | B1 | 10/2002 |
| WO | WO 2007056421 | A2 | 5/2007 |

* cited by examiner

*Primary Examiner* — David S. Warren

(57) ABSTRACT

A hearing aid with a rechargeable energy storage unit used as a power supply and an antenna used for wireless transmission and reception of electromagnetic signals is provided. The hearing aid also includes an energy charging unit which is arranged between the antenna and the energy storage unit, with the energy transmitted electromagnetically in a charging mode to the antenna being fed electrically via the energy charging unit into the energy storage unit. An energy charger and an energy storage method are also provided.

16 Claims, 3 Drawing Sheets

HEARING AID AND ENERGY CHARGER AS WELL AS ASSOCIATED METHOD

CROSS REFERENCE TO RELATED APPLICATIONS

This application claims priority of German application No. 10 2008 023 352.8 DE filed May 13, 2008, which is incorporated by reference herein in its entirety.

FIELD OF INVENTION

The invention relates to a hearing aid specified in the claims with an antenna for wireless transmission and reception, an energy charger specified in the claims for charging a hearing aid as well as a method specified in the claims for charging the hearing aid.

BACKGROUND OF INVENTION

Hearing aids are wearable hearing apparatuses used to assist those with impaired hearing. To meet the numerous individual requirements different designs of hearing aid are provided, such as behind-the ear hearing aids and in-the-ear hearing aids. The typical hearing aids mentioned are worn on the outer ear or in the auditory canal. Above and beyond these designs however there are also bone conduction hearing aids, implantable or vibro-tactile hearing aids available on the market. In such hearing aids the damaged hearing is simulated either mechanically or electrically.

Hearing aids principally have as their main components an input converter, an amplifier and an output converter. The input converter is as a rule a sound receiver, e.g. a microphone, and/or an electromagnetic receiver, e.g. an induction coil. The output converter is mostly implemented as an electroacoustic converter, e.g. a miniature loudspeaker or as an electromechanical converter, e.g. bone conduction earpiece. The amplifier is usually integrated into a signal processing unit. This basic structure is shown in FIG. 1, using a behind-the ear hearing aid 1 as an example. One or more microphones 2 for recording the sound from the surroundings are built into a hearing aid housing 7 for wearing behind the ear. A signal processing unit 3 which is also integrated into the hearing aid housing 7 processes the microphone signals and amplifies them. The output signal of the signal processing unit 3 is transmitted to a loudspeaker or earpiece 4 which outputs an acoustic signal. The sound is transmitted, if necessary via a sound tube, which is fixed with an otoplastic in the auditory canal, to the hearing aid wearer's eardrum. The power is supplied to the hearing aid and especially to the signal processing unit 3 by a battery 5 also integrated into the hearing aid housing 7. A coil 6 arranged in the hearing aid housing 7 can be used to exchange data inductively in a non-contact manner with another hearing aid or with a remote control.

Charging rechargeable cells or batteries of a hearing aid frequently means taking the rechargeable cell or the battery out of the hearing aid, inserting it in a charger and charging it. After charging as a rule very small and difficult-to-handle batteries must be taken out of the charger and put back into the hearing aid. An alternate charging process consists of leaving the rechargeable cell in the hearing aid and charging it there using a wired system. Corresponding metallic contacts are to be provided on the hearing aid for this purpose. The disadvantage of these contacts is that they mostly protrude from the housing and are not flush with the latter. As a result they can easily get dirty.

The practice of transmitting energy wirelessly to a hearing aid is also known. The energy transfer for this can be undertaken by electrical (capacitive), magnetic (inductive) or electromagnetic fields. Such charging demands at least one additional component in the hearing aid, which converts the corresponding field into electrical energy.

Generally an inductive method is used for wireless charging of rechargeable cells. The transmitter operates with a transmit coil and the receiver of the energy likewise uses a coil for receiving the energy. These types of coil are relatively large, which with hearing aids in particular, runs counter to the constantly strived-for goal of miniaturization.

WO 2007/056421 A2 describes this type of apparatus for wireless charging of a hearing aid battery with coils. In addition to transmission of electrical energy, data can also be transmitted wirelessly.

DE 197 45 101 A1 relates to an in-the-ear hearing aid with a hearing aid charging circuit with a coil for wirelessly receiving electrical energy. Data of a voltage measurement can likewise be received via the coil.

In subsequently published patent application DE 10 2007 009 176 B1 a solution is proposed in which the injection of energy into a hearing aid for charging its rechargeable cell is undertaken using components that occupy as little space as possible. The coil of an earpiece is thus used to couple in energy for charging the rechargeable cell inductively. Alternatively acoustic energy can also be coupled in via the earpiece or the microphones and converted there into electrical energy.

SUMMARY OF INVENTION

The object of the invention is to specify a further hearing apparatus, an associated energy charging apparatus and a method in which energy can be transmitted inductively to the hearing apparatus. A further problem lies in exchanging data between the hearing apparatus and the energy charging apparatus.

In accordance with the invention the given problem is solved with the apparatuses of the independent claims as well as the method also specified in the claims.

The invention comprises a hearing aid with a rechargeable energy storage unit for power supply and with an antenna for wireless transmission and reception of electromagnetic signals. An energy charging unit is arranged between the antenna and the energy storage unit, with energy transmitted electromagnetically to the antenna being fed electrically via the energy charging unit into the energy storage unit. The advantage of this is that a wireless charging function can be implemented without additional components and without adversely affecting a wireless communication via the antenna.

In a further embodiment the energy charging unit can be a charge regulator for regulating a voltage induced in the antenna and a charge status monitoring unit for detecting an amount of energy flowing out of or into the energy storage unit. This smooths and regulates the voltage as well as measuring the charge current.

In a development the charge regulator and the charge status monitoring unit can be electrically connected to the control logic unit, with the control logic unit being switched between the charging mode and a communication mode. This offers the advantage of simple switching between a charging mode and a communication mode.

Furthermore the antenna can be embodied as an antenna coil, with the energy able to be transmitted inductively. This allows sufficient amounts of energy to be transmitted in the near field of electrical fields.

Advantageously a Schottky diode can be connected in parallel to a parasitic diode rectifying the induced voltage between the antenna and the ground. The advantage of this is the increase in the charge current and thereby in the effectiveness of the charging process.

In a further embodiment the hearing aid can contain a transceiver module for wireless transmission and reception of electromagnetic signals via the antenna. This allows data to be transmitted from and to the hearing aid.

In a development first data can be transmitted from an energy charger to the hearing aid during charging operation, with the electromagnetic energy transmitted to the antenna being modulated. The transceiver module can determine the first data from the modulated energy. This brings the advantage of simple data transmission in parallel to charging mode.

Furthermore second data can be transmitted to the energy charger in a communication mode of the transceiver module. This allows status information about the charge state of a battery to be transmitted for example.

Advantageously a switchover between charging mode and communication mode can be undertaken under timer control or under protocol control. This brings the advantage of versatile control.

The invention also specifies an energy charger for inductive charging of the inventive hearing aid. A data transmission unit in the energy charger modulates the electromagnetic energy transmitted from the energy charger to the antenna for transmission of data. This offers the advantage of data being able to be transmitted in parallel to charging.

In a further embodiment the data transmission unit in the energy charging unit can receive inductively transferred data. This enables data of the hearing aid to be evaluated.

The invention also specifies a method for charging a rechargeable energy storage unit of a hearing aid with an antenna for wireless transmission and reception of electromagnetic signals. In a charging mode electromagnetic energy is transmitted to the antenna of the hearing aid. This is injected electrically via an energy charging unit into the energy storage unit.

In a development, for data transmission between the hearing aid and an energy charger, first data can be transmitted from the energy charger to the hearing aid during charging operation, with the electromagnetic energy transmitted to the antenna being modulated.

Advantageously in a communication mode second data can be transmitted from the hearing aid to the energy charger.

Furthermore the switch can be made between charging mode and communication mode under time control or protocol control.

BRIEF DESCRIPTION OF THE DRAWINGS

Further special features and advantages of the invention are evident from the subsequent illustrations of a number of exemplary embodiments based on schematic drawings.

The figures are as follows.

DETAILED DESCRIPTION OF INVENTION

Figure 1:
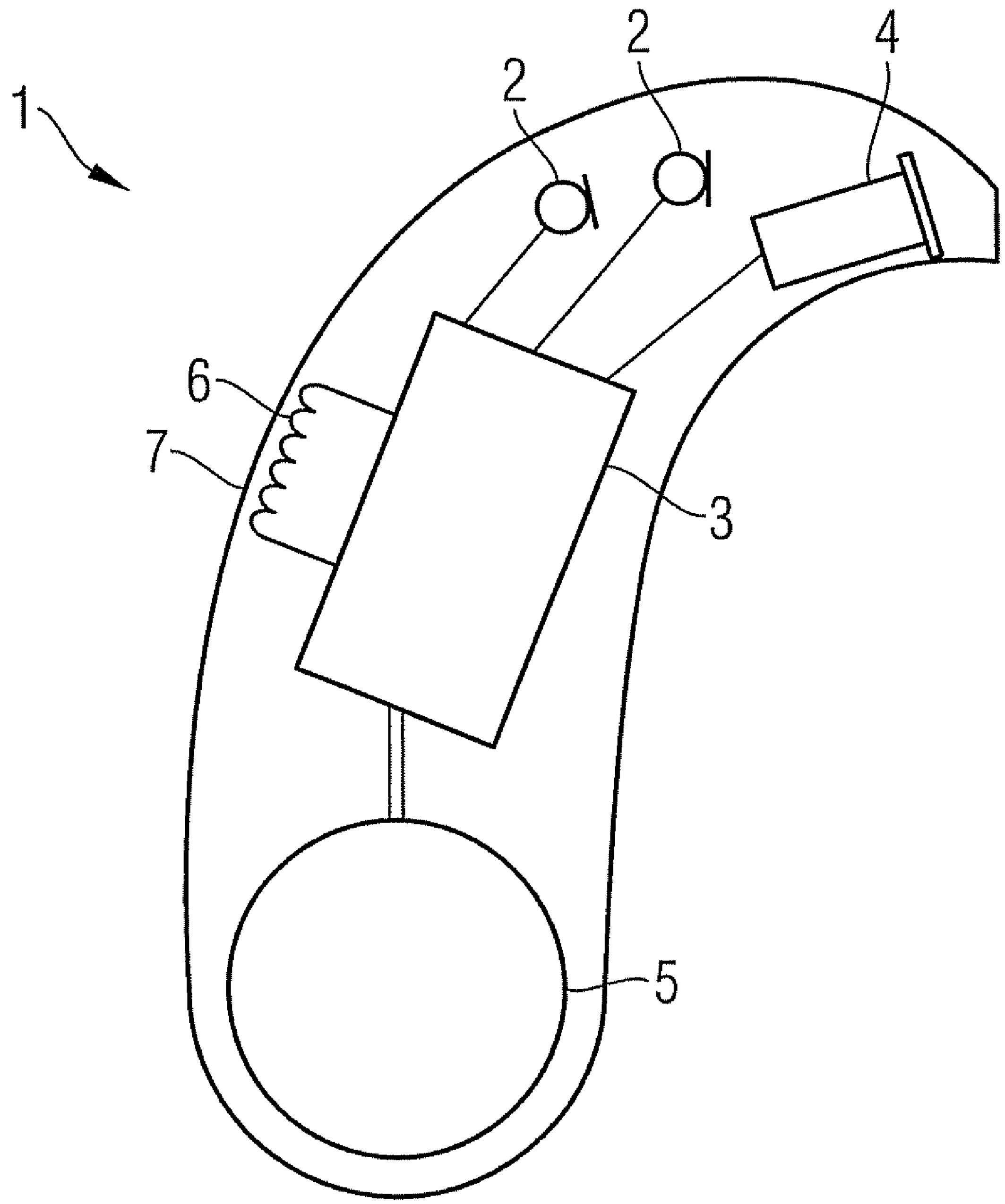
FIG. 1: a basic structure of a hearing aid in accordance with the prior art.
Figure 2:
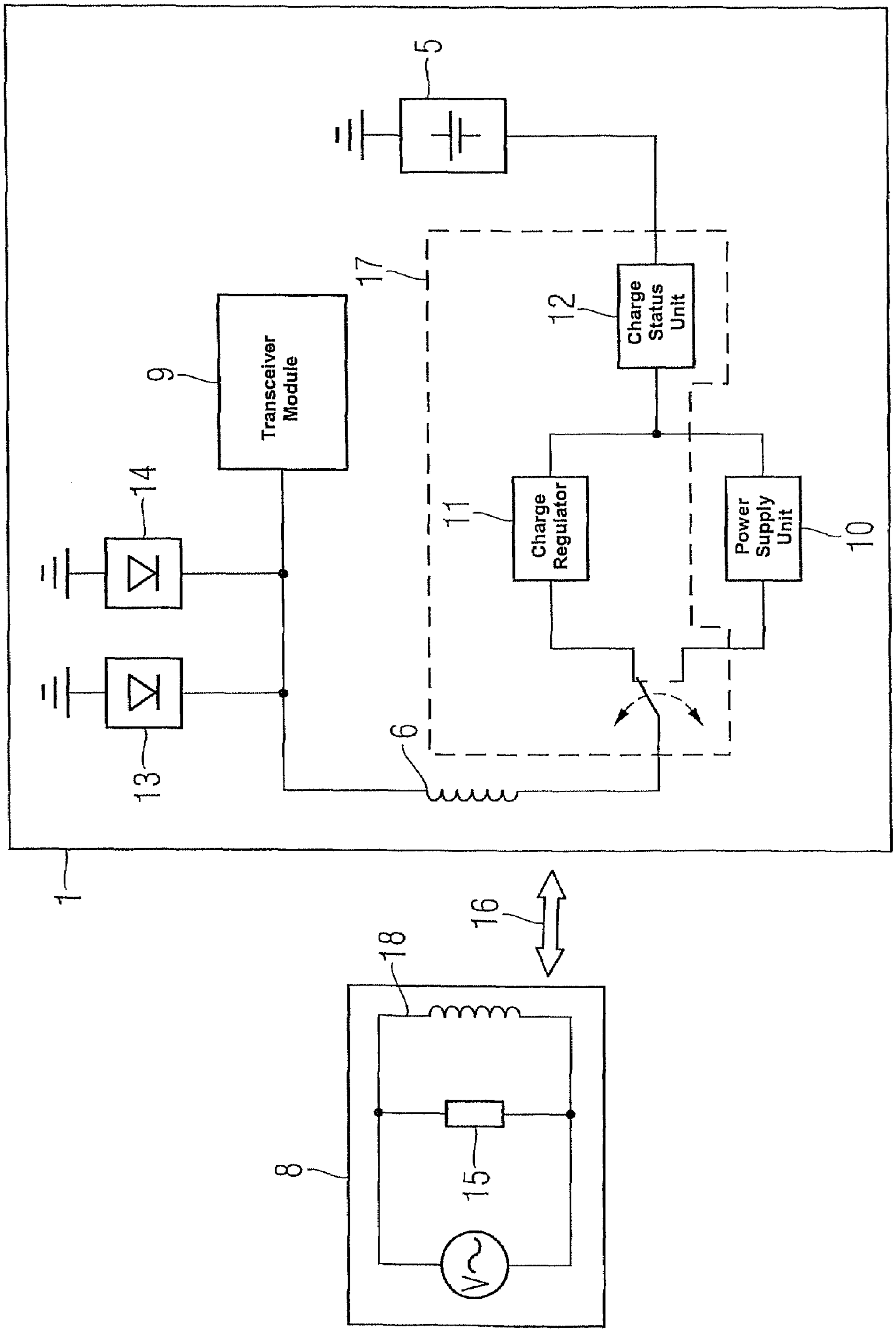
FIG. 2: a block diagram with inductive charging system in accordance with the invention

FIG. 2 shows a block diagram of a hearing aid 1 and of an associated energy charger 8. FIG. 2 shows only those components which are necessary to understand the invention. Arranged in the hearing aid 1 is an antenna coil 6 which in conjunction with a transceiver unit 9 and a power supply unit 10, allows a bidirectional wireless data transmission between the hearing aid 1 and a peripheral unit, for example another hearing aid or a remote control. The power supply unit 10 is supplied by a rechargeable battery 5.

Inventively the antenna coil 6 provided for the data transmission is used for non-contact or wireless charging of the battery 5 with electrical energy. The particular requirements to also use the antenna coil 6 as receiver for an energy transmission system, lies in not adversely affecting the functionality of the wireless data transmission when doing so. In particular no additional semiconductor switches, such as switching transistors for example, may be connected to the antenna coil 6, since by their parasitic characteristics these would make the parameters of the resonant input circuit worse. This would impermissibly reduce the coverage of the wireless data transmission. It is thus not possible to disconnect the antenna coil 6 for the purposes of energy transmission by means of a semiconductor switch from the transceiver unit 9 and connect it to an energy transmission rectifier.

The invention makes use of the fact that a parasitic diode 13 exists from one end of the antenna coil 6 to ground. The parasitic diode 13 is the result of the semiconductor fabrication process and can be used for rectifying a voltage induced in the antenna coil 6. This makes it possible to convert the transceiver circuit of a hearing aid into an energy transmission circuit almost without changes. With a control logic not shown in the figure the power supply unit 10 is disconnected from the antenna coil 6 and a charge regulator 11 and a charge status unit 12 connected between the antenna coil 6 and the battery 5. One output of the coil 6 is connected to an input of the charge regulator 11. One output of the charge regulator 11 is connected to an input of the charge status control unit 12, of which the output is coupled to the input of the battery 5.

By means a coil 18 in the energy charger 8, energy is transmitted in a non-contact manner to the antenna coil 6 by a voltage being induced. In normal operation the antenna coil 6 is used as an antenna for the wireless data transmission. However if the hearing aid 1 is inserted in a charging cradle of the energy charger 8 a charge mode is activated and the voltage induced in the antenna coil 6 is rectified by the parasitic diode 13. During the charging mode no data transmission from the hearing aid to the energy charger is possible. The rectified voltage is regulated by the charge regulator 11. The amount of charge flowing out of the battery 5 or into the battery 5 is detected by the charge status control unit 12. Both are connected to the control logic via a communication interface not shown. The control logic is designed to control the switchover between the "charging" and "wireless communication" states. During a half wave of the induced voltage a pulsing current flows through the parasitic diode 13, which then leads after smoothing to a charge current in the battery 5.

The functionality of the parasitic diode 13 is supported by parallel connection of a Schottky diode 14. As a result of the semiconductor fabrication process the Schottky diode cannot be implemented in the semiconductor chip itself but must be connected externally to the chip.

The inventive apparatus enables an existing wireless data transmission system of the hearing aid 1 to be retained and the antenna coil 6 to also be used for the transmission of energy. During the energy transmission however no data transfer from the hearing aid 1 to the energy charger 8 is possible, since the transmitter unit 9 in the hearing aid 1 is blocked by the strong, externally applied magnetic field of the energy charger 8.

Inventively however a data transfer from the energy charger 8 to the hearing aid 1 is possible. The existing transceiver unit 9 of the hearing aid 1 is also used for this purpose. With the aid of a data transmission unit 15 in the energy charger 8 the field of the energy charger 8 is correspondingly modulated. The modulated signal is thus on the one hand used for the energy transmission and on the other hand for the data transmission from the energy charger 8 to the hearing aid 1. For a data transmission from the hearing aid 1 to the energy charger 8 the field is switched off by the energy charger 8 under time control, e.g. using a time slot method, in which after a predefined time the direction of transmission is switched, or under protocol control, for example through handshaking. The energy charger 8 then switches to receive mode. The hearing aid 1 sends data with the existing transceiver unit 9.

Figure 3:
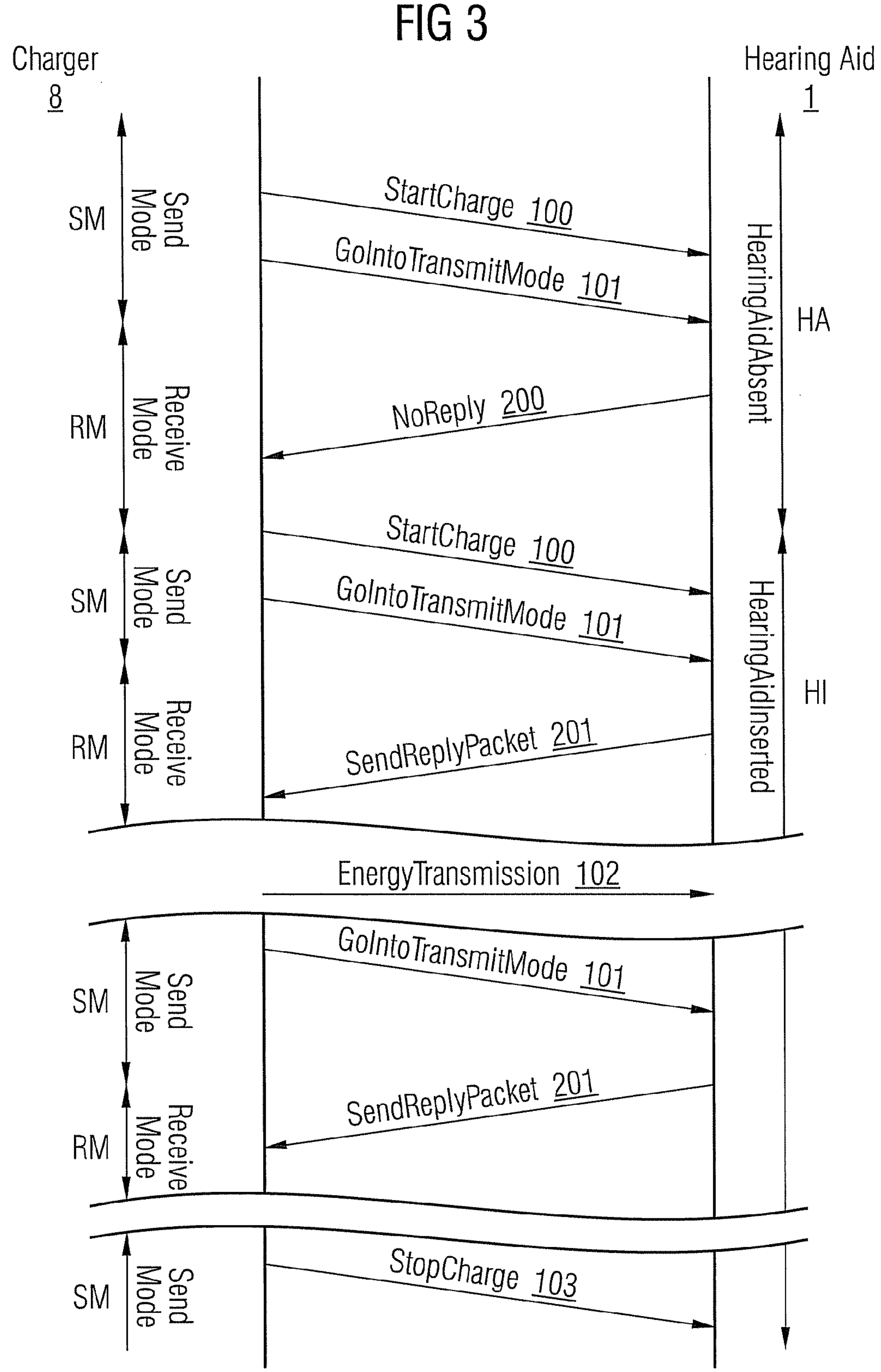
FIG. 3: a diagram of an inventive protocol-controlled communication sequence between a hearing aid and an energy charger.

FIG. 3 shows an inventive example of a protocol-controlled communication sequence between a hearing aid 1 and an energy charger 8. In an initial state "hearing aid absent" HA there is no hearing aid 1 in the energy charger 8. The energy charger 8 alternates continuously from a send mode SM to a receive mode-RM and vice versa. In the send mode SM the energy charger 8 sends a start charge signal 100 to the hearing aid 1. In addition the signal "go into transmit mode" 101 is sent. Since there is no hearing aid 1 in the energy charger 8 no reply 200 is received. Subsequently a hearing aid 1 is placed into the energy charger 8. This produces the state "hearing aid inserted" HI. The hearing aid 1 now receives the signals "start charging" 100 and "go into transmit mode" 101 and sends back the packet 201 as a reply to the energy charger 8. Then the energy charger 8 switches into the energy transmission mode 102. During the energy charging further transmission packets 101, 201 can be exchanged. If the energy charging process is completed, the energy charger 8 sends the command "Stop charge" 103 to the hearing aid 1. The charge process is stopped.

In other words: The energy charger 8 sends continuously or at regular intervals, for example every 3 seconds, commands to switch over into a charge mode and a request to send data. This can be done with little energy so that the energy charger 8 in the unused state consumes as little current as possible. If no data comes back from the hearing aid 1 this is detected in the charger as the state "hearing aid absent" HA and shown accordingly If there is an answer, which can contain the type of the hearing aid 1, the battery charge state or required charge current, the projected duration of the charging process is shown at the energy charger 8 and the charge process begins. In this process the energy charger 8 sends requests at regular intervals to the hearing aid, to notify the status and returns to receive mode RM immediately thereafter. After the end of the charging process the energy charger 8 sends the command to the hearing aid to end the charge process and to go into a sleep mode with little energy consumption. If the hearing aid 1 is removed prematurely from the charging cradle of the energy charger 8 this is detected and displayed in the energy charger 8 on the basis of the absence of a reply. The hearing aid 1 detects the state "I have been removed from the charging cradle" by the fact that requests are no longer arriving from the energy charger 8.

The transitions between the states in the hearing aid 1 and in the energy charger 8 can be controlled in each case with a state machine. This can be both hard wired in the hardware and also be implemented as a software-controlled microcontroller machine.

The invention claimed is:

1. A hearing aid comprising:
- a rechargeable energy storage unit used as a power supply;
- an antenna used for wireless transmission and reception of electromagnetic signals between a second hearing aid and/or a remote control; and
- an energy charging unit,
- wherein the energy charging unit is arranged between the antenna and the rechargeable energy storage unit,
- wherein in a charging mode an energy transmitted electromagnetically to the antenna is fed electrically via the energy charging unit into the energy storage unit, and
- wherein the energy charging unit comprises a charge regulator for controlling a voltage induced in the antenna and a charge status monitoring unit for detecting an amount of energy flowing out of or into the rechargeable energy storage unit.

2. The hearing aid as claimed in claim 1, wherein the charge regulator and the charge status monitoring unit are electrically connected to a control logic unit, with the control logic unit switching between the charging mode and a communication mode.

3. The hearing aid as claimed in claim 1, wherein the antenna comprises an antenna coil, enabling the energy to be transmitted inductively.

4. The hearing aid as claimed in claim 1, wherein a parasitic diode arranged between the antenna and a ground is used for a rectification of an induced alternating current.

5. The hearing aid as claimed in claim 4, wherein a Schottky diode is connected in parallel to the parasitic diode, the Schottky diode arranged between the antenna and the ground whereby rectifying the induced alternating current.

6. The hearing aid as claimed in claim 1, wherein a transceiver module is used for wireless transmission and reception of the electromagnetic signals via the antenna.

7. The hearing aid as claimed in claim 6,
- wherein a first data of an energy charger is transmitted to the hearing aid during the charging mode, and
- wherein the energy transmitted to the antenna is modulated whereby the transceiver module determines the first data from a modulated energy.

8. The hearing aid as claimed in claim 7, wherein a second data is sent to the energy charger from the transceiver module in the communication mode.

9. The hearing aid as claimed in claim 8, wherein a switchover between the charging mode and the communication mode is undertaken under a time control or a protocol control.

10. A method for charging a rechargeable energy storage unit of a hearing aid having an antenna for a wireless transmission and reception of an electromagnetic signal to and from a second hearing aid and/or a remote control, comprising:
- transmitting an electromagnetic energy to the antenna in a charging mode; and
- electrically feeding the electromagnetic energy through an energy charging unit into the rechargeable energy storage unit, wherein the energy charging unit comprises a charge regulator and a charge status monitoring unit,
- wherein the method further comprises:
- controlling a voltage induced in the antenna, by the charge regulator, and detecting an amount of energy flowing out of or into the rechargeable energy storage unit, by the charge status monitoring unit.

11. The method as claimed in claim 10, wherein a first data is transmitted from an energy charger which charges the rechargeable energy storage unit to the hearing aid during a charging mode, whereby the electromagnetic energy transmitted to the antenna is modulated.

12. The method as claimed in claim 11, wherein a second data is transmitted from the hearing aid to the energy charger in a communication mode.

13. The method as claimed in claim 12, a switch between the charging mode and the communication mode is made under a time control or under a protocol control.

14. The method as claimed in claim 10, wherein the charge regulator and the charge status monitoring unit are electrically connected to a control logic unit, with the control logic unit switching between the charging mode and the communication mode.

15. The method as claimed in claim 10, wherein the antenna comprises an antenna coil, enabling the electromagnetic energy to be transmitted inductively.

16. The method as claimed in claim 10, wherein a parasitic diode arranged between the antenna and a ground is used for a rectification of an induced alternating current.

* * * * *